(12) United States Patent
Koizumi et al.

(10) Patent No.: US 11,784,535 B2
(45) Date of Patent: Oct. 10, 2023

(54) ACTUATOR

(71) Applicant: NSK LTD., Tokyo (JP)

(72) Inventors: Kazunori Koizumi, Kanagawa (JP); Hayao Watanabe, Kanagawa (JP)

(73) Assignee: NSK LTD., Tokyo (JP)

( * ) Notice: Subject to any disclaimer, the term of this patent is extended or adjusted under 35 U.S.C. 154(b) by 266 days.

(21) Appl. No.: 17/283,782

(22) PCT Filed: Sep. 26, 2019

(86) PCT No.: PCT/JP2019/037893
§ 371 (c)(1),
(2) Date: Apr. 8, 2021

(87) PCT Pub. No.: WO2020/075517
PCT Pub. Date: Apr. 16, 2020

(65) Prior Publication Data
US 2021/0391767 A1 Dec. 16, 2021

(30) Foreign Application Priority Data

Oct. 9, 2018 (JP) .................................. 2018-191234
Jul. 5, 2019 (JP) .................................. 2019-126347

(51) Int. Cl.
*H02K 7/06* (2006.01)
*H02K 5/173* (2006.01)
(Continued)

(52) U.S. Cl.
CPC ............... *H02K 7/06* (2013.01); *H02K 5/173* (2013.01); *H02K 7/003* (2013.01); *H02K 16/00* (2013.01); *H02K 1/12* (2013.01)

(58) Field of Classification Search
CPC .......... H02K 7/06; H02K 5/173; H02K 7/003; H02K 16/00; H02K 1/12
(Continued)

(56) References Cited

U.S. PATENT DOCUMENTS 5,100,271 A * 3/1992 Kameyama ......... F16H 25/2018
408/239 R
5,649,451 A 7/1997 Ruland
(Continued)

FOREIGN PATENT DOCUMENTS

CN 204068559 U 12/2014
JP 2003-065416 A 3/2003
(Continued)

OTHER PUBLICATIONS

International Search Report for PCT/JP2019/037893 dated Nov. 19, 2019 (PCT/ISA/210).
(Continued)

*Primary Examiner* — Terrance L Kenerly
(74) *Attorney, Agent, or Firm* — Sughrue Mion, PLLC

(57) ABSTRACT

An actuator includes: a first motor including a first stator and a first rotor; a second motor and including a second stator and a second rotor; a shaft member penetrating through the first rotor and the second rotor, and including a first part protruding from the first rotor toward an opposite side to the second rotor and including a spline groove, and a second part protruding from the second rotor toward an opposite side to the first rotor and including a male screw portion; a spline outer cylinder engaging with the spline groove to guide the shaft member and configured to rotate together with the first rotor to enable the shaft member to rotate; and a nut member provided with a female screw portion engaging with the male screw portion of the shaft member, and configured to rotate together with the second rotor to enable the shaft member to move.

8 Claims, 10 Drawing Sheets

(51) Int. Cl.
  *H02K 7/00*   (2006.01)
  *H02K 16/00*  (2006.01)
  *H02K 1/12*   (2006.01)
(58) Field of Classification Search
  USPC ..................................................... 310/75 R
  See application file for complete search history.

(56) References Cited

U.S. PATENT DOCUMENTS

| | | |
|---|---|---|
| 6,355,999 B1 | 3/2002 | Kichiji et al. |
| 7,443,121 B2 * | 10/2008 | Nagai ..................... H02K 7/06 |
| | | 318/434 |
| 9,954,416 B2 | 4/2018 | Kataoka et al. |
| 2019/0085957 A1 | 3/2019 | Matsuto et al. |

FOREIGN PATENT DOCUMENTS

| | | |
|---|---|---|
| JP | 2008-036747 A | 2/2008 |
| JP | 2013-230076 A | 11/2013 |
| WO | 2017/163908 A1 | 9/2017 |

OTHER PUBLICATIONS

Taiwanese Office Action dated Jun. 30, 2023 in Taiwanese Application No. 108136030.

* cited by examiner

ACTUATOR

CROSS-REFERENCE TO RELATED APPLICATION

This application is a National Stage of PCT international application Ser. No. PCT/JP2019/037893 filed on Sep. 26, 2019 which designates the United States, incorporated herein by reference, and which is based upon and claims the benefit of priority from Japanese Patent Application No. 2018-191234 filed on Oct. 9, 2018, and Japanese Patent Application No. 2019-126347 filed on Jul. 5, 2019, the entire contents of which are incorporated herein by reference.

FIELD

This disclosure relates to an actuator.

BACKGROUND

An actuator that performs a rotational movement and a linear movement is known (refer to Patent Literature 1). The actuator described in Patent Literature 1 includes a ball screw and a ball spline, and a shaft member in which a screw shaft of the ball screw and a shaft of the ball spline are connected to each other is used. In this configuration, a nut of the ball screw rotates to cause the shaft member to perform a linear movement, and a spline outer cylinder of the ball spline rotates to cause the shaft member to perform a rotational movement.

Furthermore, the actuator of Patent Literature 1 includes a dual shaft integrated motor. The dual shaft integrated motor includes a first rotor, and a second rotor arranged on a radially outer side of the first rotor. A nut is fixed to the first rotor, and the nut rotates to cause the shaft member to perform a linear movement. The second rotor causes the shaft member to perform a rotational movement.

CITATION LIST

Patent Literature

Patent Literature 1: Japanese Patent Application Laid-open No. 2013-230076

Technical Problem

The actuator of Patent Literature 1 includes a dual shaft integrated motor in which the second rotor is arranged on the radially outer side of the first rotor, and thus it may be difficult to reduce footprint.

For the foregoing reasons, there is a need for an actuator that reduces the footprint to achieve space savings.

SUMMARY

An actuator according to an aspect of the present disclosure includes: a first motor that includes a first stator and a first rotor rotatable relative to the first stator in an axial rotation direction around a center axis; a second motor that is arranged away from the first motor in an axis line direction of the center axis and includes a second stator and a second rotor rotatable relative to the second stator and arranged on the same axis as the center axis of the first rotor; a shaft member that penetrates through the first rotor and the second rotor in the axis line direction and includes a first part protruding from the first rotor toward an opposite side to the second rotor in one side of the axis line direction, at least a part of the first part being provided with a spline groove extending along the axis line direction, and a second part protruding from the second rotor toward an opposite side to the first rotor in the other side of the axis line direction, at least a part of the second part being provided with a male screw portion; a spline outer cylinder that engages with the spline groove to guide the shaft member in the axis line direction along the spline groove of the shaft member and is configured to rotate together with the first rotor to enable the shaft member to rotate in the axial rotation direction around the center axis; and a nut member that is provided with a female screw portion engaging with the male screw portion of the shaft member and is configured to rotate together with the second rotor to enable the shaft member to move in the axis line direction of the center axis.

In the actuator, the spline outer cylinder, the first motor, the second motor, and the nut member are arranged along the axis line direction of the center axis. Thus, the size in the radial direction decreases, and the footprint is reduced, resulting in space savings, as compared to the actuator having a dual shaft integrated motor in which the second rotor is arranged on the radially outer side of the first rotor.

Furthermore, the first motor and the second motor are separated from each other, and thus it is possible to individually set the torque of each motor. Furthermore, the spline outer cylinder is provided on the side of one end of the shaft member, and the nut member is provided on the side of the other end of the shaft member. Thus, the vibration and inclination of the shaft member due to rotation of the spline outer cylinder and the nut member are reduced compared to the case in which the spline outer cylinder and the nut member are both provided on the side of one end of the shaft member.

Desirably, a diameter of the spline groove in the shaft member may be larger than a diameter of the male screw portion.

The spline outer cylinder rotates in the axial rotation direction around the center axis by a driving force of the first motor, and the shaft member rotates together with the spline outer cylinder. In this case, the diameter of the spline groove in the shaft member is larger than the diameter of the male screw portion, and thus the rigidity of the spline groove is higher than that of the male screw portion. Thus, when the shaft member is rotated and stopped at a predetermined position in the peripheral direction, the shaft member can be stopped at a position closer to the predetermined position. Furthermore, when an operation of rotating the shaft member is performed until the shaft member reaches the predetermined position in the peripheral direction, a period of time required until the shaft member is positioned at a final predetermined position is reduced.

Desirably, the shaft member may be separated into a shaft including the first part and a screw shaft including the second part, and the shaft and the screw shaft may be connected to each other by screw fastening.

As a result, when the shaft or the screw shaft is worn, for example, it is sufficient to replace, among the shaft and the screw shaft, only the member that is worn, for example, and thus it is possible to reduce the cost of parts.

Desirably, the first motor and the second motor may be direct drive motors.

The direct drive motor directly transmits a generated driving force to an object without intervention of a deceleration mechanism. In other words, it is possible to rotate the shaft member by directly rotating the spline outer cylinder using the driving force of the first motor. Furthermore, it is possible to cause the shaft member to move linearly by directly rotating the nut member using the driving force of the second motor.

Desirably, an arm mounting member may be fixed to an end of the first part of the shaft member, and the arm mounting member may support an arm part to which a workpiece is mounted.

The spline outer cylinder engaging with the spline groove is provided in the first part of the shaft member, and thus the vibration and inclination are reduced when the shaft member rotates. Consequently, the vibration and inclination at the time of rotation of the arm mounting member and the arm part are also reduced, which enables a workpiece to rotate and move upward and downward stably.

Desirably, the actuator further may include a clamp mechanism including a collet through which the second part of the shaft member penetrates, and a cylinder including a piston through which the second portion of the shaft member penetrates, a cylinder tube that accommodates the piston, and an elastic member that is configured to urge the piston; the piston may include a chuck part configured to come in contact with an outer peripheral surface of the collet by the elastic member to press the collet against the shaft member; and the collet may be configured to move away from the shaft member when gas or liquid is supplied to an inside of the cylinder tube.

With this configuration, the elastic member can urge the chuck part such that the chuck part is in contact with the outer peripheral surface of the collet. Then, the chuck part can press the collet against the shaft member to clamp the shaft member. Furthermore, the chuck part has a configuration of coming in contact with the outer peripheral surface of the collet, and thus overlaps with the outer peripheral surface in the radial direction. With such a configuration, it is possible to reduce the dimension of the clamp mechanism in the axis line direction. Furthermore, it is possible to unclamp the shaft member by supplying gas or liquid to the inside of the cylinder tube. Furthermore, it is possible to hold the shaft member by the clamp mechanism even when a power source is cut off.

Desirably, the outer peripheral surface may be a tapered surface having a diameter decreasing toward the chuck part, and the chuck part may be an inclined surface opposed to the outer peripheral surface.

With this configuration, the inclined surface can be in surface contact with the tapered surface while gas or liquid is not supplied to the inside of the cylinder tube. As a result, it is possible to increase a friction force that occurs between the collet and the chuck part compared to a case in which the outer peripheral surface of the collet and the chuck part are in line or point contact with each other. Therefore, it is possible to hamper the outer peripheral surface of the collet from sliding through the chuck part while the collet is clamping the shaft member.

Desirably, a radially outer side of the spline outer cylinder may be supported by a spline outer cylinder housing via a rolling bearing.

When the shaft member supporting the workpiece receives a rotation moment from the workpiece, the shaft member may receive a force in such a direction as to cause the shaft member to be inclined with respect to the center axis. Meanwhile, the radially outer side of the spline outer cylinder is supported by the spline outer cylinder housing via the bearing. Thus, a displacement or vibration of the spline outer cylinder in the radial direction orthogonal to the axis line direction of the center axis is hampered.

Desirably, a cylindrical space may be formed between the first part and a cylindrical part that is included in the arm mounting member fixed to a top end of the first part and covers an outer periphery of the first part.

Due to the cylindrical space, a labyrinth structure is formed between the first part and the outside of the cylindrical space, and thus dust resistance and water resistance of the inner side of the arm mounting member are improved.

Advantageous Effects of Invention

According to an aspect of the present disclosure, it is possible to provide an actuator that can reduce the footprint and achieve space savings.

DESCRIPTION OF EMBODIMENTS

Now, a description is given in detail of modes (embodiments) for carrying out the invention with reference to the drawings. Details described in the following embodiments are not to limit the present invention. Furthermore, components described below include a component that could easily be assumed by a person skilled in the art and substantially the same component. Furthermore, the components described below can be appropriately combined with each other.

First Embodiment

Figure 1:
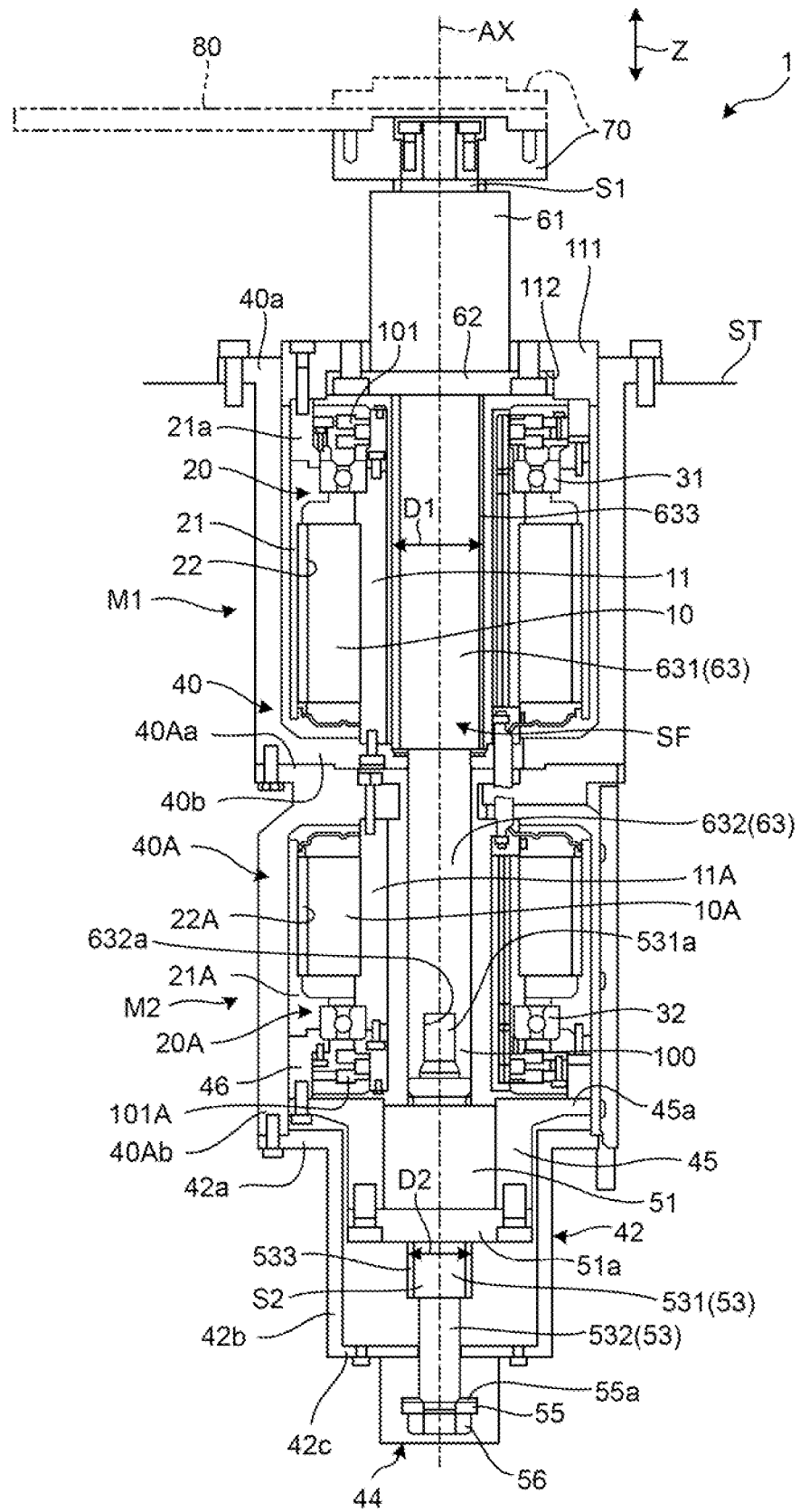
FIG. 1 is a cross-sectional diagram of an actuator according to a first embodiment.
Figure 2:
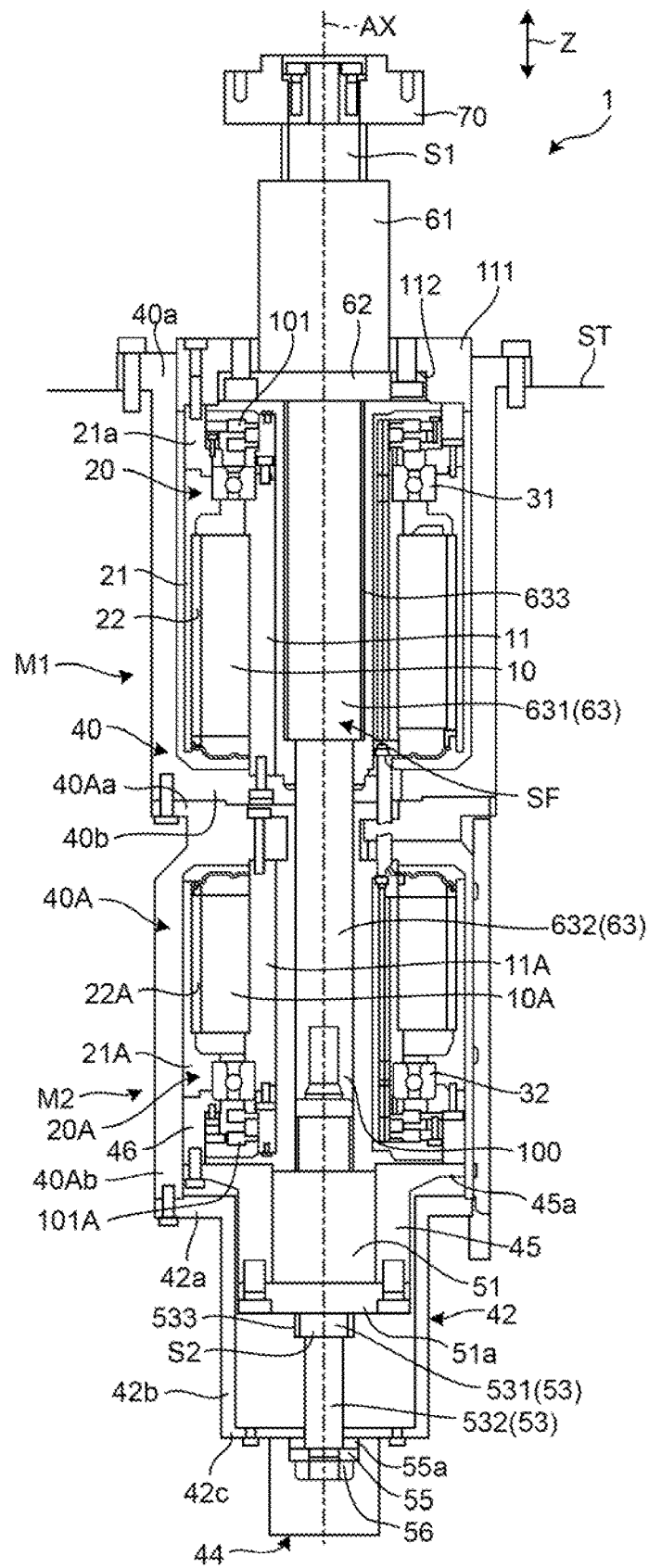
FIG. 2 is a cross-sectional diagram of the actuator according to the first embodiment and represents a state in which a stroke of a shaft member is at an upper limit position.

FIG. 1 is a cross-sectional diagram of an actuator according to a first embodiment. The cross-section in FIG. 1 is a cross-section taken along a plane including a center axis AX of a first rotor and a second rotor described later. FIG. 2 is a cross-sectional diagram of the actuator according to the first embodiment and represents a state in which a stroke of a shaft member is at an upper limit position.

As illustrated in FIG. 1, the actuator 1 is used as a pick-and-place machine, for example. The actuator 1 includes an arm part 80, a first motor M1, a second motor M2, a shaft member SF, a spline outer cylinder 61, and a nut member 51.

In the following, a description is given on the assumption that a direction from the first motor M1 to the arm part 80, which is parallel to a Z direction, is referred to as an upward direction, and a direction from the arm part 80 to the first motor M1, which is parallel to the Z direction, is referred to as a downward direction. It is also assumed that an axis line direction of the center axis AX of the arm part 80 is the same as the Z direction.

The arm part 80 is, for example, a cantilever arm having only a single arm. The actuator 1 is fixed to a fixing stage ST with the center axis AX of the arm part 80 directed in the Z direction, for example. The arm part 80 is fixed onto an arm mounting member 70. The arm mounting member 70 is fixed to an upper end of a shaft 63, which will be described later, via a bolt. The actuator 1 causes the arm part 80 to move up and down in the Z direction (linear-movement direction, or axis line direction of center axis AX) and causes the arm part 80 to rotate in an axial rotation direction around the center axis AX, on a plane orthogonal to the Z direction. A workpiece, which is not shown, is mounted on the arm part 80, and thus the workpiece is transferred to a desired position.

The first motor M1 includes a first stator 10, a first rotor 20, a first motor housing 40, and a first rotation detector 101.

A first stator holder 11 is arranged on the radially inner side of the first stator 10. The first stator 10 is fixed to the first stator holder 11. The first rotor 20 is arranged on the outer peripheral side of the first stator 10. The first rotor 20 rotates around the center axis AX. The first rotor 20 includes a first rotor bracket 21 and a first rotor core 22 fixed to the radially inner side of the first rotor bracket 21 and having a permanent magnet. The first rotor bracket 21 has a cylindrical shape with the center axis AX serving as the center. The first rotor bracket 21 includes an outer ring holder 21a for supporting an outer ring of a first bearing 31.

The first stator 10 and the first rotor 20 are arranged on the same axis with the center axis AX serving as the center. The first rotor 20 is arranged on the radially outer side of the first stator 10 and the first stator holder 11 and rotates relative to the first stator 10. In other words, the first rotor 20 is supported by the first stator 10 and the first stator holder 11 via the first bearing 31 so as to be rotatable. The first stator holder 11 is fixed to the first motor housing 40 via a bolt. The first stator 10 is cylindrical and provided around the center axis AX.

The first motor housing 40 is cylindrical, for example, and accommodates the first motor M1. The upper end of the first motor housing 40 is open, and a first cover member 111 is provided on the open part of the first motor housing 40. The first cover member 111 is fixed to the outer ring holder 21a of the first rotor bracket 21 via a bolt. A through hole is formed in the radially center part of the first cover member 111, and the through hole is covered by the spline outer cylinder 61. A recess 112 recessed in the upward direction is formed in the bottom surface of the first cover member 111.

A flange 62 extending in a radial direction is provided on the lower end of the spline outer cylinder 61. The flange 62 is fixed to the first cover member 111 via a bolt with the flange 62 inserted into the recess 112. A mounting flange 40a extending toward the radially outer side is provided on the upper end of the first motor housing 40. The mounting flange 40a can be placed on the upper surface of the fixing stage ST and be fixed to the fixing stage ST via a bolt. A minute space is formed between an outer peripheral end of the first cover member 111 and an inner peripheral end of the first motor housing 40, and the first cover member 111 can rotate relative to the first motor housing 40.

The first rotation detector 101 is, for example, a resolver. The first rotation detector 101 detects a rotation state of the first motor M1. The first rotation detector 101 is arranged on the upper side of the first bearing 31.

The second motor M2 is arranged in line with the first motor M1 in the axis line direction of the center axis AX. The second motor M2 includes a second stator 10A, a second rotor 20A, a second motor housing 40A, and a second rotation detector 101A. The first motor M1 and the second motor M2 are cylindrical direct drive motors.

The second rotor 20A is arranged on the outer peripheral side of the second stator 10A. The second rotor 20A rotates around the center axis AX serving as the center. In other words, the center axis of the second rotor 20A is the same as the center axis AX of the first rotor 20. The second rotor 20A includes a second rotor bracket 21A and a second rotor core 22A fixed to the radially inner side of the second rotor bracket 21A and having a permanent magnet. The second rotor bracket 21A has a cylindrical shape with the center axis AX serving as the center. The second stator 10A and the second rotor 20A are arranged on the same axis with the center axis AX serving as the center.

The second rotor 20A is arranged on the radially outer side of the second stator 10A and a second stator holder 11A and rotates relative to the second stator 10A and the second stator holder 11A. In other words, the second rotor 20A is supported by the second stator 10A and the second stator holder 11A via a second bearing 32 so as to be rotatable. The second stator 10A is fixed to the second stator holder 11A arranged on the radially inner side of the second stator 10A. The second stator holder 11A is fixed to the second motor housing 40A via a bolt. The second stator 10A is cylindrical and provided around the center axis AX.

Now, a description of the shaft member SF is given. The shaft member SF includes the shaft 63 on the upper side and a screw shaft 53 on the lower side. The shaft 63 extends from the arm mounting member 70 to a connection part 100 along the axis line direction of the center axis AX. The connection part 100 is provided at a position in line with the second rotation detector 101A. The shaft 63 includes a large diameter part 631 and a small diameter part 632. The large diameter part 631 extends from the arm mounting member 70 to a lower bottom part 40b of the first motor housing 40.

A plurality of spline grooves 633 extending in the axis line direction of the center axis AX are formed in the outer periphery of the large diameter part 631 at intervals in the peripheral direction. A spline part (not shown) having a plurality of convex portions that can engage with the spline grooves 633 is provided on the inner peripheral side of the spline outer cylinder 61. In this manner, the shaft member SF includes a first part S1 protruding from the first rotor 20 toward the opposite side to the second rotor 20A in the upward direction, which is a direction toward one side in the axis line direction, and the spline grooves 633 extending along the axis line direction are formed in the first part S1. The spline grooves 633 and the spline part engage with each other via a plurality of balls, such that the shaft member SF can be guided in the axis line direction along the spline part and rotate together with the first rotor 20, whereby the shaft member SF can rotate in the axial rotation direction around the center axis. The small diameter part 632 extends from the lower end of the large diameter part 631 to the connection part 100. In this manner, a ball spline for guiding rolling is employed for the first part S1.

The screw shaft 53 extends from the connection part 100 to a stopper 55. The screw shaft 53 includes a large diameter part 531 on the upper side and a small diameter part 532 on the lower side. An extremely small diameter part 531a protruding in the upward direction is provided on the top end (upper end of FIG. 1) of the large diameter part 531 of the screw shaft 53. A male screw is provided on the outer periphery of the extremely small diameter part 531a. A recess 632a is formed in the lower end of the small diameter part 632 of the shaft 63. A female screw that engages with the male screw of the extremely small diameter part 531a is provided on the inner periphery of the recess 632a. The female screw on the inner periphery of the recess 632a engages with the male screw of the extremely small diameter part 531a. As a result, the small diameter part 632 of the shaft 63 and the large diameter part 531 of the screw shaft 53 are connected to each other in an integrated manner. In other words, the shaft 63 and the screw shaft 53 are connected to each other by screw fastening. A male screw portion 533 is formed on the outer periphery of the large diameter part 531. In other words, the shaft member SF includes a second part S2 protruding from the second rotor 20A toward the opposite side to the first rotor 20 in the downward direction, which is a direction toward the other side in the axis line direction, and the male screw portion 533 is provided on the second part S2. A diameter D1 of the spline groove 633 in the shaft member SF is larger than a diameter D2 of the male screw portion 533. The diameter D1 of the spline groove 633 is the large diameter out of the large diameter and the small diameter. The diameter D2 of the male screw portion 533 is an outer diameter out of the outer diameter and an inner diameter (root diameter).

The second motor housing 40A is cylindrical, for example, and accommodates the second motor M2. The upper end of the second motor housing 40A is open, and the shaft member SF is provided so as to penetrate through the open part of the second motor housing 40A. An upper bottom part 40Aa extending in a ring form in the axial rotation direction around the center axis AX is provided on the outer periphery of the open part. The upper bottom part 40Aa is in contact with the lower bottom part 40b of the first motor housing 40, and is fixed to the lower bottom part 40b via a bolt. A lower bottom part 40Ab of the second motor housing 40A is also open, and the open part is covered by a nut housing 42 and a stopper cover 44.

The nut housing 42 includes an upper end flange 42a, a cylindrical part 42b having a cylindrical shape extending in the downward direction from the inner peripheral end of the upper end flange 42a, and a bottom part 42c extending from the lower end of the cylindrical part 42b toward the inner peripheral side. The upper end flange 42a is fixed to the lower bottom part 40Ab of the second motor housing 40A via a bolt. The stopper cover 44 is fixed to the bottom part 42c of the nut housing 42 via a bolt. A through hole is formed in the bottom part 42c, and the small diameter part 532 of the screw shaft 53 is provided so as to penetrate through the through hole.

The stopper 55 is attached to the lower end of the small diameter part 532 by a nut 56. The stopper 55 is a member having a ring shape. The stopper 55 is inserted into the screw shaft 53. A cushion member 55a having a ring shape is arranged on the upper side of the stopper 55 in the Z direction. The cushion member 55a is, for example, a urethane rubber as an elastic material. When the shaft member SF is moved upward, the stopper 55 comes in contact with the bottom part 42c of the nut housing 42 via the cushion member 55a, whereby the upward movement of the shaft member SF can be regulated. The nut housing 42 accommodates the nut member 51 and a second connection bracket 45.

A female screw portion is provided on the inner peripheral side of the nut member 51. The female screw portion engages with the male screw portion 533 of the second part S2 of the shaft member SF via a plurality of balls. The second connection bracket 45 is arranged on the radially outer side of the nut member 51. A flange part 51a extending toward the radially outer side is provided on the lower end of the nut member 51. The flange part 51a is fixed to the second connection bracket 45 via a bolt. A flange 45a extending toward the radially outer side is provided on the upper end of the second connection bracket 45 and fixed to a first connection bracket 46 via a bolt. In this manner, a ball screw for guiding rolling is employed for the second part S2.

The first connection bracket 46 is fixed to the second rotor bracket 21A via a bolt. In this manner, the nut member 51, the second connection bracket 45, the first connection bracket 46, and the second rotor bracket 21A can rotate in an integrated manner. Specifically, the nut member 51, the second connection bracket 45, the first connection bracket 46, and the second rotor bracket 21A are supported so as to be rotatable relative to the second stator 10A and the second stator holder 11A via the second bearing 32.

The second rotation detector 101A is, for example, a resolver. The second rotation detector 101A detects a rotation state of the second motor M2. The second rotation detector 101A is arranged at a position in line with the connection part 100 in the axis direction.

Next, the motion of the actuator 1 is described.

First, a description is given of a mode in which the shaft member SF moves upward and downward (moves linearly). In this mode, only the second motor M2 operates, and the first motor M1 does not operate.

As illustrated in FIG. 1, when the second motor M2 operates, the second rotor 20A rotates in the axial rotation direction around the center axis AX. Specifically, the second rotor 20A rotates around the center axis AX relative to the second stator 10A and the second stator holder 11A via the second bearing 32. The first rotor 20 does not rotate.

The nut member 51 is integrated with the second rotor 20A. Thus, the nut member 51 also rotates in the axial rotation direction around the center axis AX integrally with the second rotor 20A. The female screw portion of the nut member 51 engages with the male screw portion 533 of the second part S2 of the shaft member SF, and thus the shaft member SF moves linearly along the axis line direction due to the rotation of the nut member 51. Specifically, as illustrated in FIG. 2, the shaft member SF moves upward along the axis line direction. In this state, the shaft member SF moves upward and the stopper 55 comes in contact with the bottom part 42c of the nut housing 42 via the cushion member 55a, whereby the upward movement of the shaft member SF can be regulated.

Next, a description is given of a mode in which the shaft member SF turns (rotates). This mode includes a first mode, a second mode, and a third mode depending on the manner of movement of the shaft member SF in the Z direction.

In the first mode, the first motor M1 operates and the second motor M2 does not operate. As described above, the spline grooves 633 and the spline part engage with each other. This causes the shaft member SF to be guided in the axis line direction along the spline part of the spline outer cylinder 61. Furthermore, the shaft member SF rotates together with the first rotor 20 via the spline outer cylinder 61, whereby the shaft member SF can rotate in the axial rotation direction around the center axis AX. Furthermore, the second motor M2 does not operate, and thus the nut member 51 does not also rotate. Thus, when the shaft member SF is rotated by the spline outer cylinder 61, the nut member 51 causes the shaft member SF to move linearly along the axis line direction. In this manner, in the first mode, the shaft member SF rotates integrally with the spline outer cylinder 61, and at the same time, rotates relative to the stationary nut member 51, whereby the shaft member SF moves linearly in the Z direction.

In the second mode, the shaft member SF rotates integrally with the spline outer cylinder 61, and at the same time, causes the nut member 51 to rotate so as not to change the position of the shaft member SF in the Z direction. Thus, in the second mode, both of the first motor M1 and the second motor M2 operate. In other words, rotation of the first motor M1 is similar to that of the first mode, and the shaft member SF rotates together with the first rotor 20 via the spline outer cylinder 61, whereby the shaft member SF can rotate in the axial rotation direction around the center axis AX. The second motor M2, which is not caused to operate in the first mode, causes the nut member 51 to rotate in a direction opposite to the direction in which the shaft member SF moves linearly. In this manner, in the second mode, the shaft member SF rotates integrally with the spline outer cylinder 61 without change in position of the shaft member SF in the Z direction.

In the third mode, the shaft member SF rotates integrally with the spline outer cylinder 61, and at the same time, the rotation speed of the nut member 51 is adjusted appropriately, whereby a speed (movement speed in Z direction) at which the shaft member SF moves linearly can be changed. Thus, in the third mode, both of the first motor M1 and the second motor M2 operate. In other words, the rotation of the first motor M1 is similar to those of the first and second modes, and the shaft member SF rotates together with the first rotor 20 via the spline outer cylinder 61, whereby the shaft member SF can rotate in the axial rotation direction around the center axis AX. The second motor M2 sets its rotation speed in accordance with a desired speed at which the shaft member SF moves linearly. In this manner, in the third mode, the shaft member SF rotates integrally with the spline outer cylinder 61 while the movement speed of the shaft member SF in the Z direction is adjusted appropriately.

As described above, the actuator 1 according to this embodiment includes: the first motor M1 that includes the first stator 10 and the first rotor 20 rotatable relative to the first stator 10 in the axial rotation direction around the center axis AX serving as the center; the second motor M2 that is arranged away from the first motor M1 in the axis line direction of the center axis AX and includes the second stator 10A and the second rotor 20A rotatable relative to the second stator 10A and arranged on the same axis as the center axis AX of the first rotor 20; the shaft member SF that penetrates through the first rotor 20 and the second rotor 20A in the axis line direction and includes the first part S1 protruding from the first rotor 20 toward the opposite side to the second rotor 20A in one side of the axis line direction and the second part S2 protruding from the second rotor 20A toward the opposite side to the first rotor 20 in the other side of the axis line direction, at least a part of the first part S1 being provided with the spline groove 633 extending along the axis line direction, at least a part of the second part S2 being provided with the male screw portion 533; the spline outer cylinder 61 that engages with the spline groove 633 to guide the shaft member SF in the axis line direction along the spline groove 633 of the shaft member SF and rotates together with the first rotor 20 to enable the shaft member SF to rotate in the axial rotation direction around the center axis AX; and the nut member 51 that is provided with a female screw portion engaging with the male screw portion 533 of the shaft member SF and rotates together with the second rotor 20A to enable the shaft member SF to move in the axis line direction of the center axis AX.

In the actuator 1, the spline outer cylinder 61, the first motor M1, the second motor M2, and the nut member 51 are arranged along the axis line direction of the center axis AX. Thus, the size in the radial direction is reduced and the footprint is reduced, as compared to an actuator having a dual shaft integrated motor in which the second rotor 20A is arranged on the radially outer side of the first rotor 20.

Furthermore, the diameter of the spline groove 633 in the shaft member SF is larger than the diameter of the male screw portion 533.

The spline outer cylinder 61 rotates in the axial rotation direction around the center axis AX by a driving force of the first motor M1, and the shaft member SF rotates together with the spline outer cylinder 61. In this case, the diameter of the spline groove 633 in the shaft member SF is larger than the diameter of the male screw portion 533, and thus the rigidity of the spline groove 633 is higher than that of the male screw portion 533. As a result, when the shaft member SF is rotated and stopped at a predetermined position in the peripheral direction, the shaft member SF can be stopped at a position closer to the predetermined position. Furthermore, when an operation of rotating the shaft member SF is performed until the shaft member SF reaches the predetermined position in the peripheral direction, a period of time required until the shaft member SF is positioned at a final predetermined position is reduced.

The spline outer cylinder 61 is arranged near the output shaft of the first motor M1, and the nut member 51 is arranged near the output shaft of the second motor M2. Thus, the spline outer cylinder 61 is less likely to be influenced by vibration and inclination of the output shaft of the first motor M1, which enables the spline outer cylinder 61 to be assembled accurately. The nut member 51 is less likely to be influenced by vibration and inclination of the output shaft of the second motor M2, which enables the nut member 51 to be assembled accurately.

The first motor M1 and the second motor M2 are separated from each other, and thus the torque of each motor can be set individually.

The spline outer cylinder 61 is provided on the side of one end of the shaft member SF, and the nut member 51 is provided on the side of the other end of the shaft member SF. Thus, compared to the case in which the spline outer cylinder 61 and the nut member 51 are both provided on the side of one end of the shaft member SF, the vibration and inclination of the shaft member SF due to rotation of the spline outer cylinder 61 and the nut member 51 are reduced.

The motor housing, the rotor, and the stator are separated from one another in each of the first motor M1 and the second motor M2, and thus it is possible to adjust (centering) the accuracy at the time of assembling the motor and assemble the motor accurately.

The shaft member SF is separated into the shaft 63 including the first part S1 and the screw shaft 53 including the second part S2. The shaft 63 and the screw shaft 53 are connected to each other by screw fastening.

When the shaft 63 or the screw shaft 53 is worn, for example, it is sufficient to replace only the member that is worn, for example, and thus it is possible to reduce the cost of parts.

The first motor M1 and the second motor M2 are direct drive motors.

The direct drive motor directly transmits a generated driving force to an object without intervention of a deceleration mechanism. In other words, it is possible to rotate the shaft member SF by directly rotating the spline outer cylinder 61 using the driving force of the first motor M1. Furthermore, it is possible to cause the shaft member SF to move linearly by directly rotating the nut member 51 using the driving force of the second motor M2.

The arm mounting member 70 is fixed to an end of the first part S1 of the shaft member SF, and the arm mounting member 70 supports the arm part 80 to which a workpiece is mounted.

The spline outer cylinder 61 engaging with the spline groove 633 is provided in the first part S1 of the shaft member SF, and thus the vibration and inclination are reduced when the shaft member SF rotates. Consequently, the vibration and inclination at the time of rotation of the arm mounting member 70 and the arm part 80 are also reduced, which enables a workpiece to rotate and move upward and downward stably.

Second Embodiment

Next, a description is given of the actuator 1A according to a second embodiment. The same components as those of the first embodiment are denoted by the same reference signs, and a description thereof is omitted. Now, a description is mainly given of a difference from the first embodiment.

Figure 3:
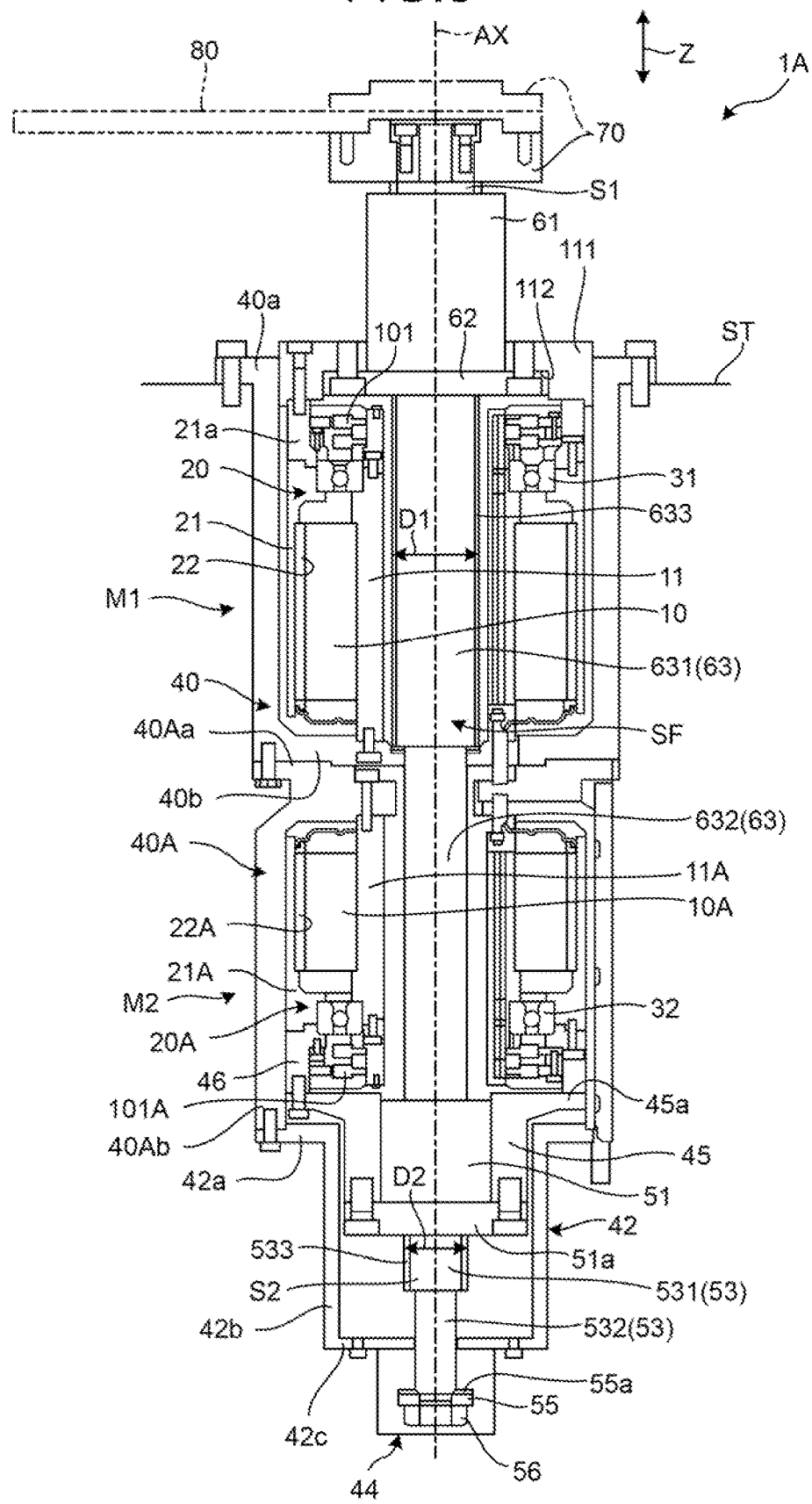
FIG. 3 is a cross-sectional diagram of an actuator according to a second embodiment.
Figure 4:
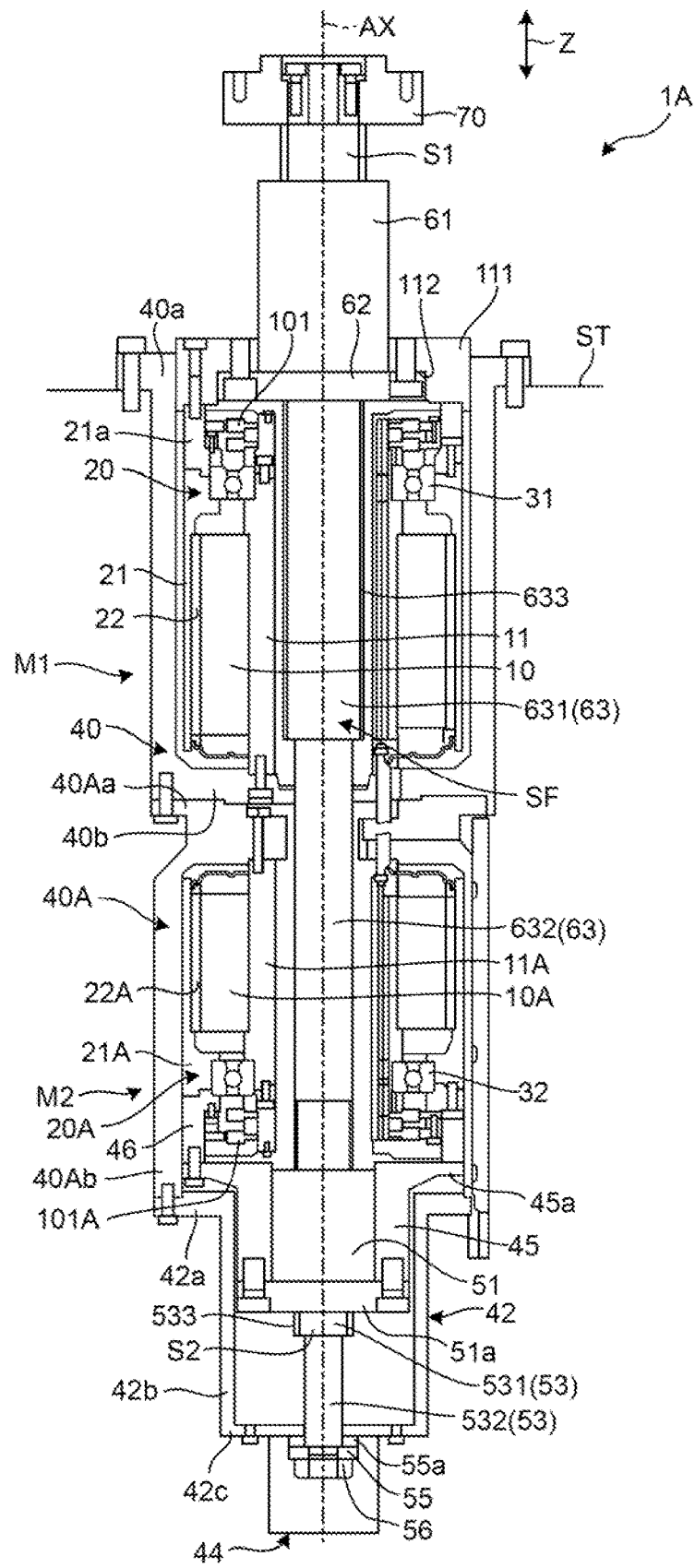
FIG. 4 is a cross-sectional diagram of the actuator according to the second embodiment and represents a state in which the stroke of the shaft member is at the upper limit position.

FIG. 3 is a cross-sectional diagram of the actuator according to the second embodiment and represents a state in which the stroke of the shaft member is at the lower limit position. FIG. 4 is a cross-sectional diagram of the actuator according to the second embodiment and represents a state in which the stroke of the shaft member is at the upper limit position.

The second embodiment is different from the first embodiment in structure of the shaft member SF. Specifically, in the first embodiment, the shaft member SF is separated into the shaft 63 on the upper side and the screw shaft 53 on the lower side. The large diameter part 531 of the screw shaft 53 and the small diameter part 632 of the shaft 63 are integrally connected to each other by screw fastening.

On the other hand, the shaft member SF according to the second embodiment is formed such that the shaft 63 on the upper side and the screw shaft 53 on the lower side are integrated with each other. For example, the outer peripheral portion of one cylinder-shaped metal member is shaved to form the shaft member SF having the shapes of the shaft 63 and the screw shaft 53. Furthermore, the diameter D1 of the spline groove 633 in the shaft member SF is larger than the diameter D2 of the male screw portion 533. The diameter D1 of the spline groove 633 is the large diameter out of the large diameter and the small diameter. The diameter D2 of the male screw portion 533 is the outer diameter out of the outer diameter and the inner diameter (root diameter).

The shaft member SF moves upward and downward and turns in the same manner as that of the first embodiment. Furthermore, when the second motor M2 operates at the lower limit position of the shaft member SF illustrated in FIG. 3, the nut member 51 also rotates together with the second rotor 20A, and as illustrated in FIG. 4, the shaft member SF moves upward along the axis line direction.

As described above, in the actuator 1A according to this embodiment, the shaft member SF is formed such that the shaft 63 on the upper side and the screw shaft 53 on the lower side are integrated with each other. Thus, the rigidity of the shaft member SF becomes higher compared to the case of connecting the separated shaft 63 and screw shaft 53 to each other.

Third Embodiment

Next, a description is given of an actuator 1B according to a third embodiment. The same components as those of the first and second embodiments are denoted by the same reference signs, and a description thereof is omitted. Now, a description is mainly given of a difference from the first embodiment.

Figure 5:
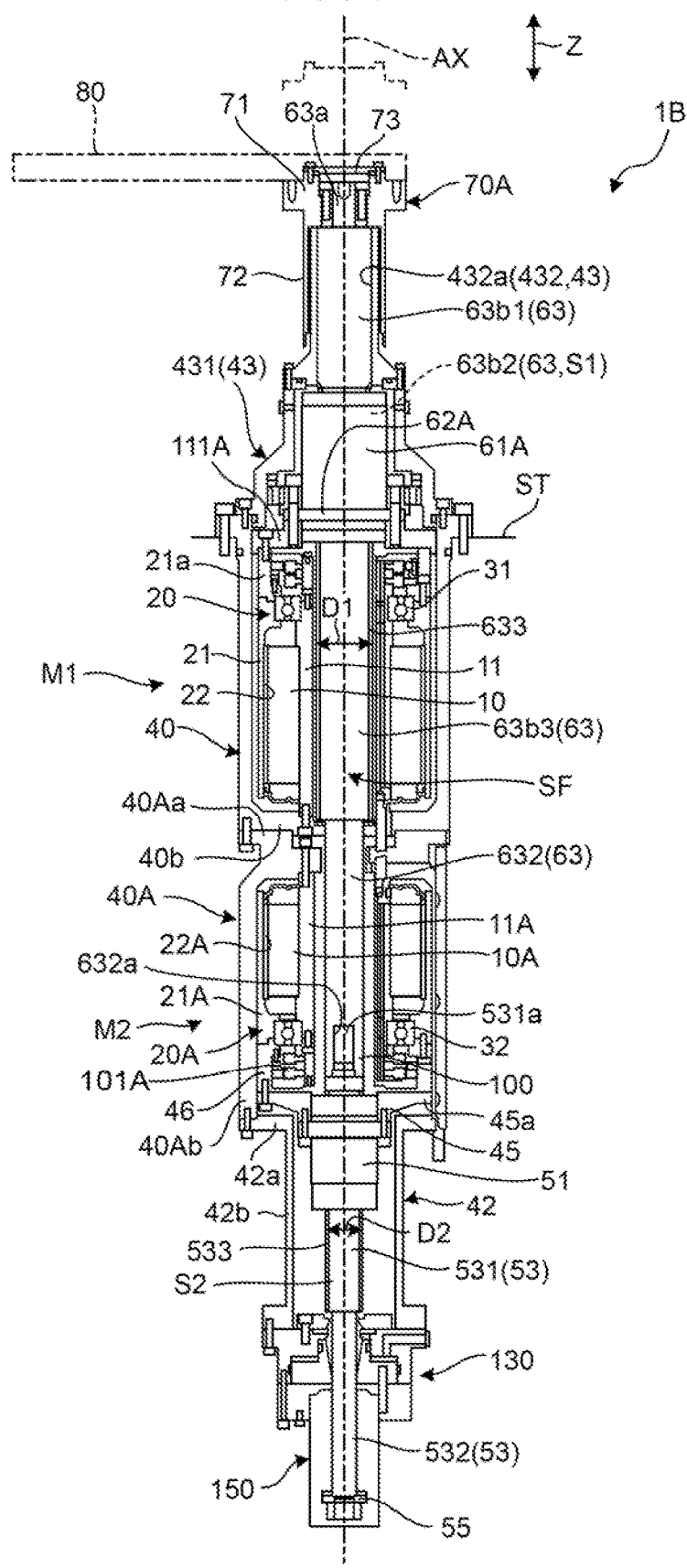
FIG. 5 is a cross-sectional diagram of an actuator according to a third embodiment.
Figure 6:
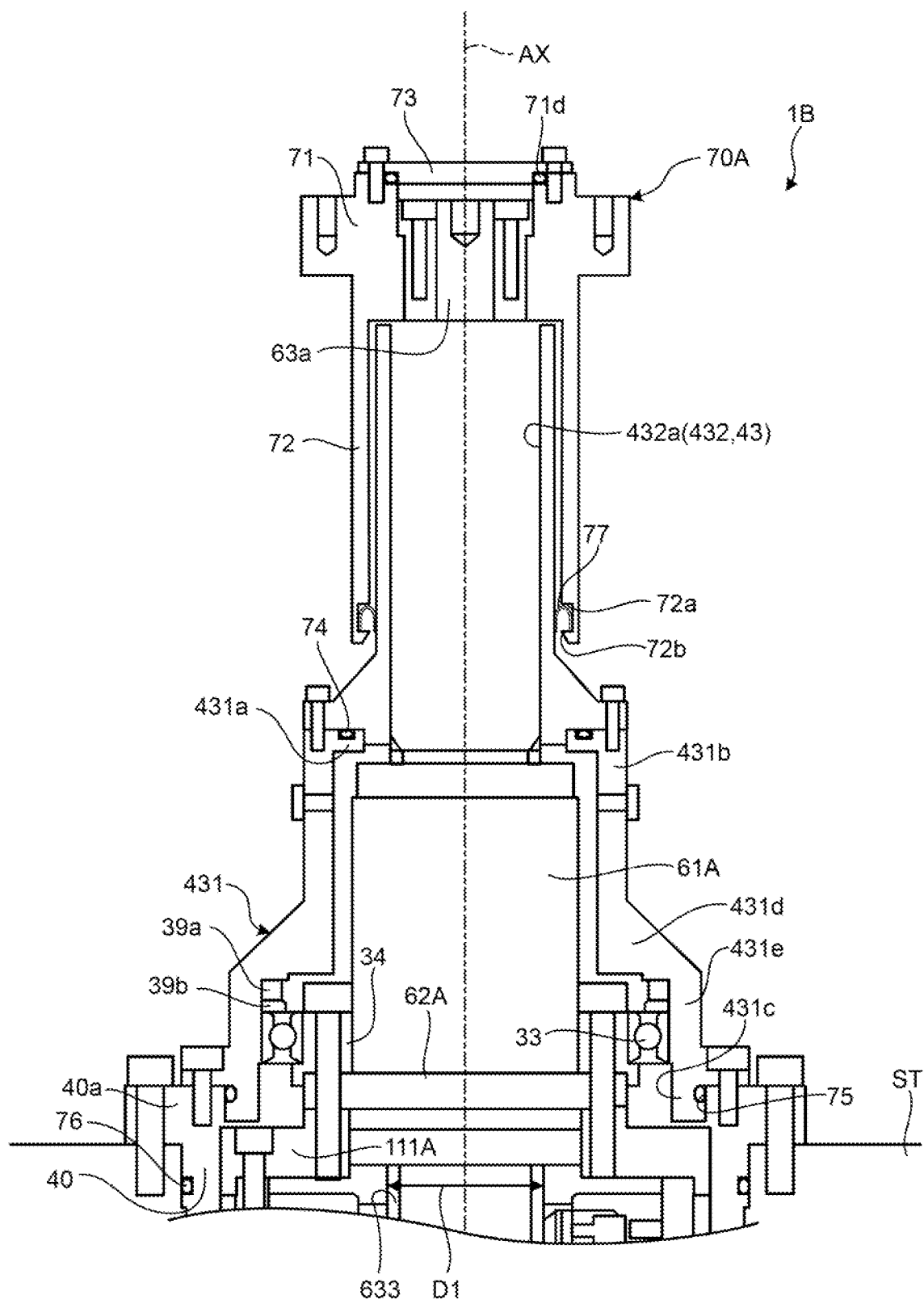
FIG. 6 is a cross-sectional diagram of an enlarged view of a main part of FIG. 5.
Figure 7:
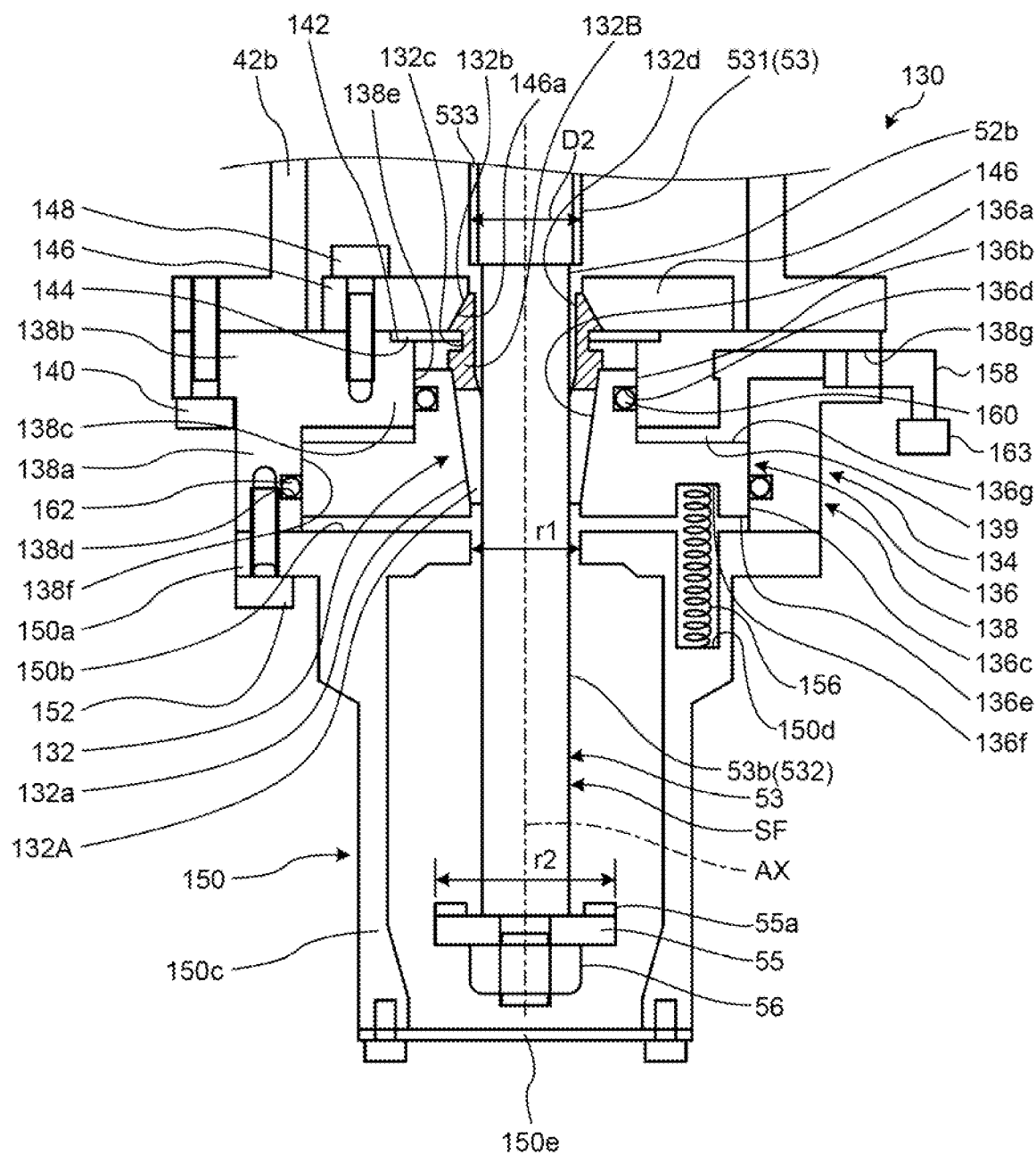
FIG. 7 is a cross-sectional diagram of an enlarged view of another main part of FIG. 5.
Figure 8:
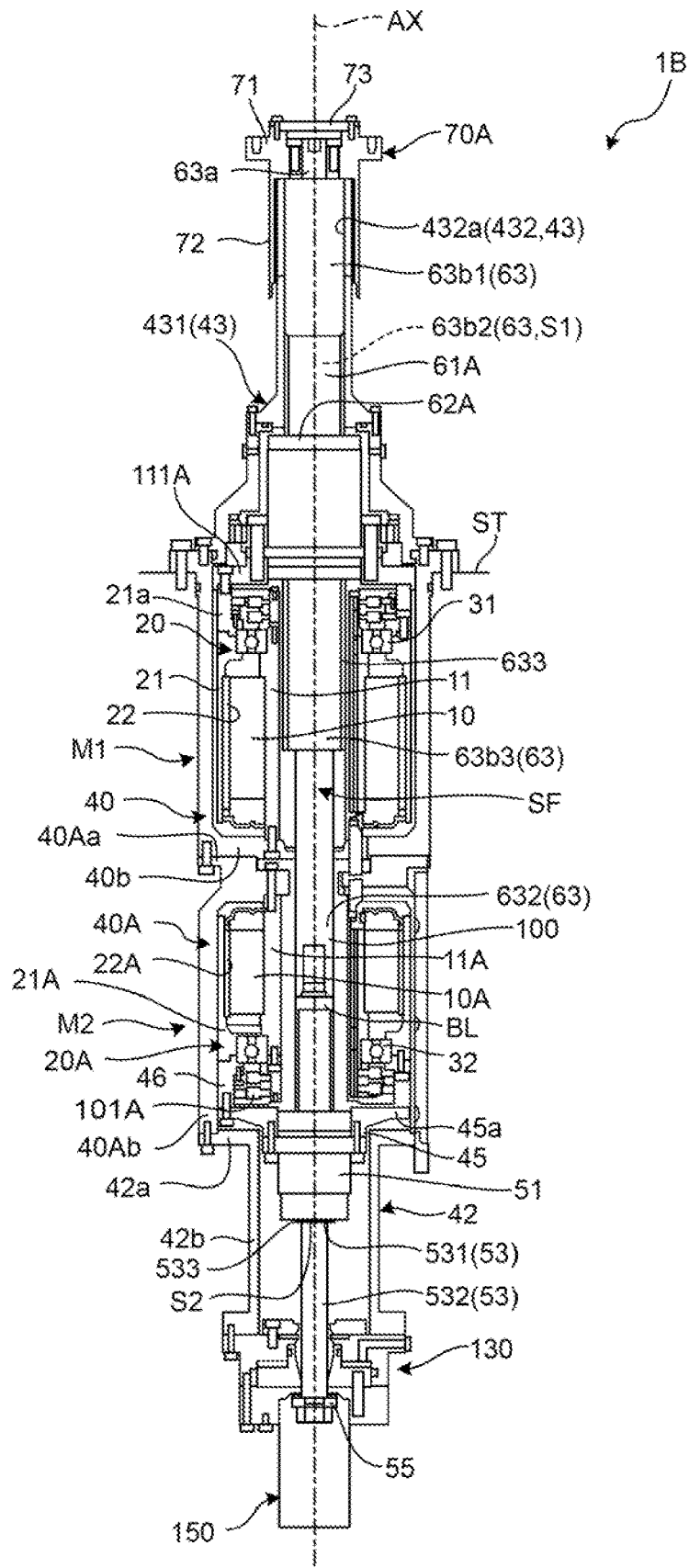
FIG. 8 is a cross-sectional diagram of the actuator according to the third embodiment and represents a state in which the stroke of the shaft member is at the upper limit position.

FIG. 5 is a cross-sectional diagram of the actuator according to the third embodiment. FIG. 6 is a cross-sectional diagram of an enlarged view of a main part of FIG. 5. FIG. 7 is a cross-sectional diagram of an enlarged view of another main part of FIG. 5. FIG. 8 is a cross-sectional diagram of the actuator according to the third embodiment and represents a state in which the stroke of the shaft member is at the upper limit position.

In this embodiment, parts (details thereof are illustrated in FIG. 6) on the upper side of the first motor M1 and parts (details thereof are illustrated in FIG. 7) on the lower side of the nut member 51 are mainly different from those of the first embodiment and the second embodiment.

An arm mounting member 70A is connected to the top end (upper end) of the shaft 63. The arm mounting member 70A includes a connection part 71, a cylindrical part 72, and a cover part 73. The connection part 71 is connected to a reduced diameter part 63a of the shaft 63.

As illustrated in FIG. 6, the cylindrical part 72 is cylindrical and is provided so as to extend in the downward direction from the connection part 71. The cylindrical part 72 is arranged on the outer side of a second cylindrical part 432 of a spline outer cylinder housing 43 and accommodates an upper portion 432a of the second cylindrical part 432. A recess 72a is formed in the lower end of the cylindrical part 72. The lower end of the inner peripheral surface is enlarged to form the recess 72a. A sealing portion 77 is arranged in the recess 72a.

The sealing portion 77 seals a space formed between the cylindrical part 72 and the upper portion 432a of the second cylindrical part 432 of the spline outer cylinder housing 43. The sealing portion 77 has, for example, structure of a U-shaped or C-shaped member being formed to be a ring in cross-sectional view. The sealing portion 77 is formed by using an elastically deformable material, for example. The sealing portion 77 causes the shaft 63 to be in a state of being protected from the outside. A protruding portion 72b protruding toward the inner side is formed on the lower end of the recess 72a. This protruding portion 72b hampers the sealing portion 77 from dropping.

Furthermore, a cylindrical space is formed between the cylindrical part 72 and the upper portion 432a of the second cylindrical part 432. Labyrinth structure is formed between the shaft 63 and the outside due to this space, and thus dust resistance and water resistance are improved.

The cover part 73 is attached to a cover attaching surface 71d of the connection part 71 via a bolt. The cover part 73 protects the reduced diameter part 63a of the shaft 63 from the outside.

The spline outer cylinder housing 43 includes a first cylindrical part 431 and a second cylindrical part 432. Furthermore, a second cover member 111A is fixed to the upper end of the first rotor bracket 21 via a bolt. A flange 62A of a spline outer cylinder 61A is fixed to the upper end of the second cover member 111A via a bolt.

The first cylindrical part 431 includes a first cylindrical portion 431b arranged on the upper side in the vertical direction, a step portion 431d arranged on the lower side of the first cylindrical portion 431b, and a second cylindrical portion 431e arranged on the lower side of the step portion 431d.

A reception portion 431a extending toward the radially inner side is provided in the first cylindrical portion 431b to form a ring shape along the peripheral direction. A recess that is recessed in the downward direction is formed in the upper surface of the reception portion 431a, and an O ring 74 is accommodated in the recess. The lower end of the second cylindrical part 432 is fixed to the reception portion 431a of the first cylindrical part 431 via a bolt with the O ring 74 pressed by the lower end surface of the second cylindrical part 432. A recess is formed in the side surface of a lower end 431c of the second cylindrical portion 431e, and an O ring 75 is accommodated in the recess.

The inner peripheral surface of the upper end of the first motor housing 40 presses the O ring 75. In this state, the lower end of the first cylindrical part 431 is fixed to the upper end of the first motor housing 40 via a bolt. Furthermore, a recess that is recessed on the radially inner side is formed in the outer peripheral surface of the upper end of the first motor housing 40, and an O ring 76 is accommodated in the recess. The mounting flange 40a of the first motor housing 40 is fixed to the upper surface of the fixing stage ST via a bolt with the O ring 76 pressed by the inner peripheral surface of the fixing stage ST.

As illustrated in FIG. 6, a third bearing 33 is held between the second cylindrical portion 431e and a connection bracket 34 in the first cylindrical part 431. The connection bracket 34 is fixed to the flange 62A of the spline outer cylinder 61A. Thus, the third bearing 33 rotatably supports the spline outer cylinder 61 and the connection bracket 34. The third bearing 33 is, for example, a rolling bearing. The third bearing 33 is supported by the step portion 431d via a waved washer 39a and the pressing member 39b. The third bearing 33 is pressed against the connection bracket 34 by the waved washer 39a and the pressing member 39b. Furthermore, the third bearing 33 is supported in a radial direction by the first cylindrical part 431, the first motor housing 40, and the fixing stage ST.

Now, a description is given of the shaft member SF. The shaft member SF includes the shaft 63 on the upper side and the screw shaft 53 on the lower side. The shaft 63 extends from the arm mounting member 70A to the connection part 100 along the axis line direction of the center axis AX. The connection part 100 is provided at a position in line with the second rotation detector 101A in the axis direction of the connection part 100. The shaft 63 is formed by combining the reduced diameter part 63a, a large diameter part 63b, and a small diameter part 632 together. The large diameter part 63b includes a first large diameter part 63b1 arranged on the lower side of the reduced diameter part 63a, a second large diameter part 63b2 accommodated in the second cylindrical part 432, and a third large diameter part 63b3 extending from the upper end of the spline outer cylinder 61A to the lower bottom part 40b of the first motor housing 40. The plurality of spline grooves 633 extending in the axis line direction of the center axis AX are formed in the outer periphery of the third large diameter part 63b3 at intervals in the peripheral direction. A part, in which the spline grooves 633 are provided, protruding above the upper end of the first rotor 20 is the first part S1.

The screw shaft 53 extends from the connection part 100 to the stopper 55. The screw shaft 53 includes the large diameter part 531 on the upper side and the small diameter part 532 on the lower side. The extremely small diameter part 531a protruding in the upward direction is provided on the upper end of the large diameter part 531 of the screw shaft 53. A male screw is provided on the outer periphery of the extremely small diameter part 531a. The recess 632a is provided on the lower end of the small diameter part 632 of the shaft 63. A female screw engaging with the male screw of the extremely small diameter part 531a is provided on the inner periphery of the recess 632a. The female screw on the inner periphery of the recess 632a engages with the male screw of the extremely small diameter part 531a. Consequently, the small diameter part 632 of the shaft 63 and the large diameter part 531 of the screw shaft 53 are integrally connected to each other. In other words, the shaft 63 and the screw shaft 53 are connected to each other by screw fastening. The male screw portion 533 is formed on the outer periphery of the large diameter part 531. In other words, the shaft member SF includes the second part S2 protruding from the second rotor 20A toward the opposite side to the first rotor 20 in the downward direction, which is a direction toward the other side in the axis line direction, and the male screw portion 533 is provided on the second part S2. A male screw portion is not provided on the outer periphery of the small diameter part 532. Furthermore, the diameter D1 of the spline groove 633 in the shaft member SF is larger than the diameter D2 of the male screw portion 533. The diameter D1 of the spline groove 633 is the large diameter out of the large diameter and the small diameter. The diameter D2 of the male screw portion 533 is the outer diameter out of the outer diameter and the inner diameter (root diameter).

As illustrated in FIG. 7, a clamp mechanism 130 includes the small diameter part 532 of the screw shaft 53, a collet 132, and a cylinder 134. The collet 132 includes a grasping portion 132A capable of deforming in the radial direction and a flange portion 132B having a substantially cylindrical shape. Four slots are formed in the grasping portion 132A in the Z direction. The cross-sectional diagram illustrated in FIG. 7 represents a cross-section taken along the slot. The slots are formed at positions that are equally 90 degrees apart in the peripheral direction. With this configuration, the grasping portion 132A can elastically deform in the radial direction. The number, shapes, and positions of the slots are not particularly limited. It is sufficient that the slot is formed so as to enable the grasping portion 132A to elastically deform in the radial direction.

The small diameter part 532 of the screw shaft 53 is inserted into the collet 132. The collet 132 includes a first tapered surface 132a, a second tapered surface 132b, a recess 132c, and an inner peripheral surface 132d. The first tapered surface 132a is an outer peripheral surface of the grasping portion 132A. The first tapered surface 132a is an inclined surface having an outer diameter that decreases toward the lower side in the Z direction. In other words, the first tapered surface 132a has a substantially conical surface.

The second tapered surface 132b is an outer peripheral surface of the flange portion 132B on the upper side in the Z direction. The second tapered surface 132b is an inclined surface having an outer diameter that decreases toward the upper side in the Z direction. In other words, the second tapered surface 132b has a substantially conical surface. The recess 132c is a groove formed in the outer peripheral surface of the flange portion 132B. The recess 132c is formed between the first tapered surface 132a and the second tapered surface 132b in the Z direction. The inner peripheral surface 132d is a surface opposed to a clamped portion 53b of the screw shaft 53. The collet 132 is arranged such that the inner peripheral surface 132d is opposed to the clamped portion 53b of the screw shaft 53 even when the screw shaft 53 has moved in the axis line direction at the maximum.

The cylinder 134 includes a piston 136, a cylinder tube 138, a first seal member 160, and a second seal member 162. Furthermore, the cylinder 134 includes a gas supply part 163, a fixing member 144, a stopper part 146, a screw shaft housing 150, and a spring 156.

The small diameter part 532 of the screw shaft 53 is inserted into the piston 136. The piston 136 includes an inclined surface 136a, a first outer side surface 136b, a second outer side surface 136c, a groove 136d, a lower surface 136e, a recess 136f, and an upper surface 136g.

The inclined surface 136a is an inner peripheral surface of the piston 136 on the upper side in the Z direction. The inclined surface 136a is inclined such that the diameter increases toward the upper side in the Z direction. The inclined surface 136a overlaps with the first tapered surface 132a in the Z direction. With such a configuration, the inclined surface 136a can come into contact with the first tapered surface 132a when the piston 136 has moved toward the upper side in the Z direction. Then, when the inclined surface 136a has come into contact with the first tapered surface 132a, the inclined surface 136a can press the first tapered surface 132a toward the radially inner side. In other words, the inclined surface 136a is a chuck part that can press the grasping portion 132A against the radially inner side. The inclined surface 136a is opposed to the first tapered surface 132a. In other words, the inclined surface 136a and the first tapered surface 132a have substantially the same inclination. The inclined surface 136a is arranged so as to overlap with the first tapered surface 132a in the radial direction. With this configuration, it is possible to reduce the dimension of a space occupied by the piston 136 and the collet 132 in the axis line direction.

The first outer side surface 136b and the second outer side surface 136c are outer side surfaces of the piston 136. The first outer side surface 136b is positioned on the upper side of the second outer side surface 136c in the Z direction. The diameter of the second outer side surface 136c is larger than that of the first outer side surface 136b. The first outer side surface 136b and the second outer side surface 136c are arranged so as to overlap with the first tapered surface 132a in the radial direction. The groove 136d is a corner groove formed in the first outer side surface 136b. The groove 136d is formed along the peripheral direction of the first outer side surface 136b. The lower surface 136e is a surface of the piston 136 on the lower side in the Z direction. The recess 136f recessed toward the upper side in the Z direction is formed in the lower surface 136e. The upper surface 136g is a surface of the piston 136 on the upper side in the Z direction.

The cylinder tube 138 is a substantially cylindrical member that accommodates the piston 136. The cylinder tube 138 includes a cylindrical part 138a, an outer diameter side flange part 138b, an inner diameter side flange part 138c, a groove 138d, a first inner side surface 138e, a second inner side surface 138f, and an gas supply path 138g. The cylindrical part 138a is a cylindrical member. The outer diameter side flange part 138b and the inner diameter side flange part 138c are connected to an end of the cylindrical part 138a on the upper side in the Z direction. The outer diameter side flange part 138b is a flange surface formed to be a ring. The outer diameter side flange part 138b is fixed to the lower end of the cylindrical part 42b by a fixing member 140. The inner diameter side flange part 138c is formed to be a ring, and is arranged on the radially inner side of the outer diameter side flange part 138b. A step surface 142 is formed on the inner diameter side flange part 138c. The step surface 142 is formed on an end of the inner diameter side flange part 138c on the upper side in the Z direction. The step surface 142 has a ring shape when viewed from the upper side in the Z direction.

The first inner side surface 138e is a radially inner side of the inner diameter side flange part 138c. The first inner side surface 138e is opposed to the first outer side surface 136b. The second inner side surface 138f is a radially inner side of the cylindrical part 138a. The diameter of the second inner side surface 138f is larger than the diameter of the first inner side surface 138e. The second inner side surface 138f is opposed to the second outer side surface 136c. The first inner side surface 138e and the second inner side surface 138f are arranged so as to overlap with the first tapered surface 132a in the radial direction. The groove 138d is a corner groove formed in the second inner side surface 138f. The groove 138d is formed along the peripheral direction of the second inner side surface 138f.

The gas supply path 138g is an opening that penetrates from the outside of the cylinder tube 138 to the inside of the cylinder tube 138. A gas supply pipe 158 is connected to the gas supply path 138g. The gas supply path 138g and the gas supply pipe 158 are fixed to each other by a screw via a seal tape, for example.

The first seal member 160 is an O ring. The first seal member 160 is arranged in the groove 136d. The first seal member 160 fills a space between the first outer side surface 136b and the first inner side surface 138e. As a result, the space between the first outer side surface 136b and the first inner side surface 138e is sealed.

The second seal member 162 is an O ring. The second seal member 162 is arranged in the groove 138d. The second seal member 162 fills a space between the second outer side surface 136c and the second inner side surface 138f. As a result, the space between the second outer side surface 136c and the second inner side surface 138f is sealed. With such a configuration, a pressure room 139 surrounded by the gas supply pipe 158, the gas supply path 138g, the first outer side surface 136b, the second outer side surface 136c, the first inner side surface 138e, the second inner side surface 138f, the first seal member 160, and the second seal member 162 is formed.

The gas supply part 163 is a compressor that supplies compressed air. The gas supply part 163 is connected to the gas supply pipe 158. The gas to be supplied by the gas supply part 163 is not limited to the compressed air. The gas supply part 163 may supply compressed nitrogen, for example.

The fixing member 144 is a plate member having a cylindrical shape. The fixing member 144 is arranged such that the lower surface of the fixing member 144 on the radially outer side is in contact with the step surface 142. Furthermore, an end of the fixing member 144 on the radially inner side is inserted into the recess 132c.

The stopper part 146 is a member having a ring shape. The small diameter part 532 of the screw shaft 53 is inserted into the stopper part 146. The stopper part 146 includes an inclined surface 146a opposed to the second tapered surface 132b. As a result, the stopper part 146 can restrict movement of the collet 132 toward the upper side in the Z direction. Furthermore, the stopper part 146 is fixed to the inner diameter side flange part 138c by a fixing member 148 with the fixing member 144 sandwiched between the stopper part 146 and the step surface 142. Thus, the stopper part 146 fixes the position of the fixing member 144 in the Z direction. The end of the fixing member 144 on the inner diameter side is inserted into the recess 132c. As a result, the fixing member 144 can restrict movement of the collet 132 toward the lower side in the Z direction. With such a configuration, the position of the collet 132 in the Z direction is determined.

The screw shaft housing 150 is fixed to the fixing stage ST via the cylinder tube 138, the nut housing 42, a motor housing 41, and the spline outer cylinder housing 43. The screw shaft housing 150 includes a flange part 150a, a flange surface 150b, a cylindrical part 150c, a recess 150d, and a cover member 150e. The flange part 150a is formed to be a ring, and is fixed to the lower end of the cylindrical part 138a by a fixing member 152. The flange surface 150b is a surface of the flange part 150a on the upper side in the Z direction.

The flange surface 150b is opposed to the lower surface 136e. The cylindrical part 150c extends in the downward direction from the inner periphery of the flange part 150a. As illustrated in FIG. 5, the cylindrical part 150c accommodates an end of the screw shaft 53 on the lower side. The recess 150d is a recess recessed from the flange surface 150b toward the lower side in the Z direction. The cover member 150e is a member that covers the lower side of the cylindrical part 150c in the Z direction. The cover member 150e is fixed to an end surface of the cylindrical part 150c on the lower side in the Z direction by a bolt. As a result, it is possible to prevent a foreign matter from intruding from the lower side in the Z direction into the screw shaft housing 150.

The spring 156 is a compressed coil spring. One end of the spring 156 is in contact with the bottom surface of the recess 136f. The other end of the spring 156 is in contact with the bottom surface of the recess 150d. Thus, the spring 156 is compressed by the bottom surface of the recess 136f and the bottom surface of the recess 150d. The screw shaft housing 150 is fixed to the fixing stage ST, and thus the bottom surface of the recess 150d does not move toward the lower side in the Z direction. Thus, the spring 156 presses the piston 136 toward the upper side in the Z direction. The spring 156 is set to be a compressed coil spring, but is not limited thereto. It is sufficient that the spring 156 is such an elastic member as to urge the piston 136 toward the grasping portion 132A. The spring 156 may be a corner spring and a conical spring, for example. A plurality of the springs 156 may be arranged.

The stopper 55 is attached to the lower end of the screw shaft 53 by the nut 56. The stopper 55 is a member having a ring shape. The stopper 55 is inserted into the screw shaft 53. The cushion member 55a having a ring shape is arranged on the upper side of the stopper 55 in the Z direction. The cushion member 55a is, for example, a urethane rubber being an elastic material. Outer diameters r2 of the cushion member 55a and the stopper 55 are larger than an inner diameter r1 of the flange part 150a. Thus, when the screw shaft 53 moves upward by a predetermined length, the stopper 55 comes in contact with the flange part 150a via the cushion member 55a. As a result, the stopper 55 can regulate upward movement of the screw shaft 53 exceeding the predetermined length.

The shaft member SF moves upward and downward and turns in the same manner as those of the first and second embodiments. Furthermore, when the second motor M2 operates at the lower limit position of the shaft member SF illustrated in FIG. 5, the nut member 51 also rotates together with the second rotor 20A, and as illustrated in FIG. 8, the shaft member SF moves upward along the axis line direction.

As described above, the actuator 1B according to this embodiment includes the clamp mechanism 130 including the collet 132 through which the second part S2 of the shaft member SF penetrates, and the cylinder 134 including the piston 136 through which the second portion of the shaft member SF penetrates, the cylinder tube 138 that accommodates the piston 136, and an elastic member configured to urge the piston 136. The piston 136 has the inclined surface 136a (chuck part) configured to be in contact with the outer peripheral surface of the collet 132 by the elastic member to press the collet 132 against the shaft member SF, and the collet 132 is configured to move away from the shaft member SF when gas or liquid is supplied to the inside of the cylinder tube 138.

With this configuration, the elastic member can urge the chuck part such that the chuck part is in contact with the outer peripheral surface of the collet 132. Then, the chuck part can press the collet 132 against the shaft member SF to clamp the shaft member. Furthermore, the chuck part has a configuration of coming in contact with the outer peripheral surface of the collet 132, and thus overlaps with the outer peripheral surface in the radial direction. With such a configuration, it is possible to reduce the dimension of the clamp mechanism 130 in the axis line direction. Furthermore, it is possible to unclamp the shaft member SF by supplying gas or liquid to the inside of the cylinder tube 138. Furthermore, it is possible to hold the shaft member SF by the clamp mechanism 130 even when a power source is cut off.

The outer peripheral surface is a tapered surface having a diameter decreasing toward the chuck part, and the chuck part is inclined surface 136a opposed to the outer peripheral surface.

With this configuration, the first tapered surface 132a can be in surface contact with the tapered surface while gas or liquid is not supplied to the inside of the cylinder tube 138. As a result, it is possible to increase a friction force that occurs between the collet 132 and the chuck part compared to a case in which the outer peripheral surface of the collet 132 and the chuck part are in line or point contact with each other. Therefore, it is possible to hamper the outer peripheral surface of the collet 132 from sliding through the chuck part while the collet is clamping the shaft member SF.

The radially outer side of the spline outer cylinder 61A is supported by the spline outer cylinder housing 43 via the third bearing 33 (rolling bearing).

For example, in a case where the arm part 80 supports a workpiece, when the center of gravity of the arm part 80 and a load of the workpiece does not coincide with the center axis AX or when rotation moments of the arm part 80 and the workpiece are received, the shaft member SF may receive a force in such a direction as to cause the shaft member SF to be inclined with respect to the center axis AX. Meanwhile, the third bearing 33 is supported by the first cylindrical part 431, the first motor housing 40, and the fixing stage ST in the radial direction via the waved washer 39a and the pressing member 39b, and thus a displacement or vibration of the spline outer cylinder 61A in the radial direction orthogonal to the axis line direction of the center axis AX is hampered.

A cylindrical space is formed between the first part S1 and a cylindrical part that is included in the arm mounting member 70A fixed to the top end of the first part S1 and covers the outer periphery of the first part S1.

Due to the cylindrical space, a labyrinth structure is formed between the first part S1 and the outside of the cylindrical space, and thus dust resistance and water resistance of the inner side of the arm mounting member 70A are improved.

Fourth Embodiment

Next, a description is given of the actuator 1C according to a fourth embodiment. The same components as those of the first, second, and third embodiments are denoted by the same reference signs, and a description thereof is omitted. Now, a description is mainly given of a difference from the third embodiment.

Figure 9:
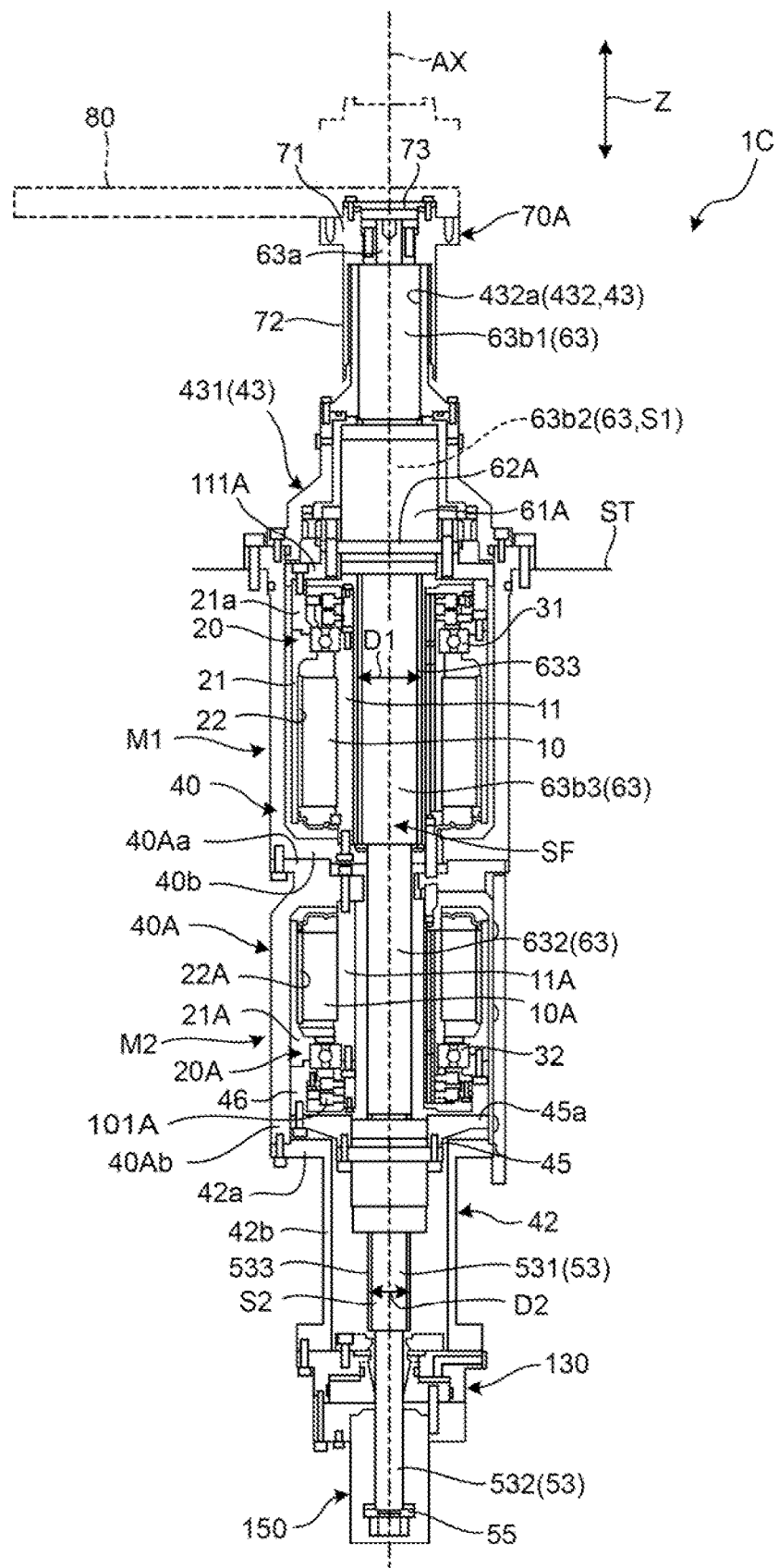
FIG. 9 is a cross-sectional diagram of an actuator according to a fourth embodiment.
Figure 10:
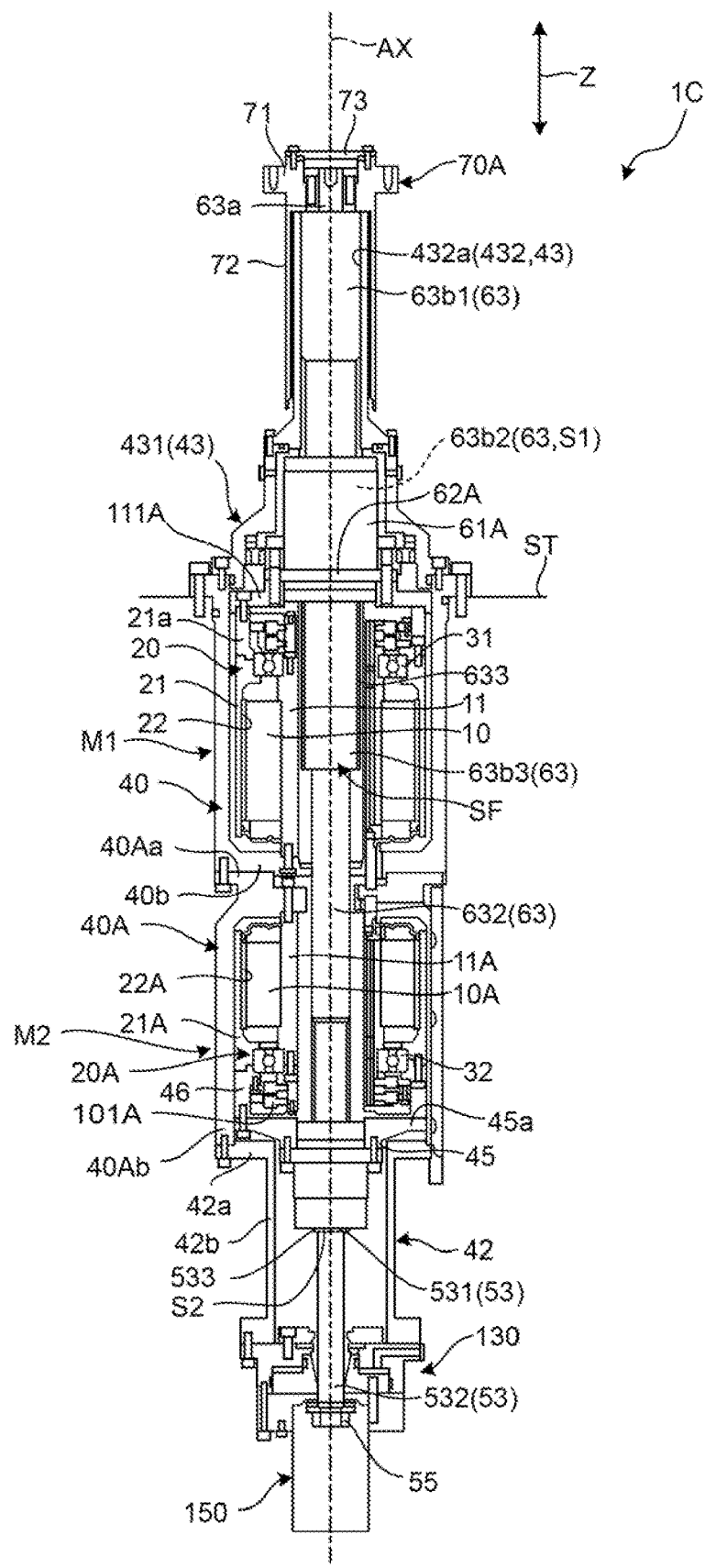
FIG. 10 is a cross-sectional diagram of the actuator according to the fourth embodiment and represents a state in which the stroke of the shaft member is at the upper limit position.

FIG. 9 is a cross-sectional diagram of an actuator according to a fourth embodiment, and represents a state in which the stroke of the shaft member is at the lower limit position. FIG. 10 is a cross-sectional diagram of the actuator according to the fourth embodiment, and represents a state in which the stroke of the shaft member is at the upper limit position.

The fourth embodiment is different from the third embodiment in terms of structure in shaft member SF.

Specifically, in the third embodiment, the shaft member SF is separated into the shaft 63 on the upper side and the screw shaft 53 on the lower side. The large diameter part 531 of the screw shaft 53 and the small diameter part 632 of the shaft 63 are integrally connected to each other by screw fastening.

On the other hand, the shaft member SF according to the fourth embodiment is formed such that the shaft 63 on the upper side and the screw shaft 53 on the lower side are integrated with each other. For example, the outer peripheral portion of one cylinder-shaped metal member is shaved to form the shaft member SF having the shapes of the shaft 63 and the screw shaft 53. Furthermore, the diameter D1 of the spline groove 633 in the shaft member SF is larger than the diameter D2 of the male screw portion 533. The diameter D1 of the spline groove 633 is the large diameter out of the large diameter and the small diameter. The diameter D2 of the male screw portion 533 is the outer diameter out of the outer diameter and the inner diameter (root diameter).

The shaft member SF moves upward and downward and turns in the same manner as those of the first, second, and third embodiments. Furthermore, when the second motor M2 operates at the lower limit position of the shaft member SF illustrated in FIG. 9, the nut member 51 also rotates together with the second rotor 20A, and as illustrated in FIG. 10, the shaft member SF moves upward along the axis line direction.

As described above, in the actuator 1C according to this embodiment, the shaft member SF is formed such that the shaft 63 on the upper side and the screw shaft 53 on the lower side are integrated with each other. Thus, the rigidity of the shaft member SF becomes higher compared to the case of connecting the separated shaft 63 and screw shaft 53 to each other.

This concludes the description of the preferred embodiments of the present invention, and the present invention is not limited to the above-mentioned embodiments. For example, the mode of connecting the shaft 63 and the screw shaft 53 to each other by screw fastening in the shaft member SF has been described, but the end of the shaft 63 may be pressed into the end of the screw shaft 53 to be connected. In other cases, the shaft 63 and the screw shaft 53 may be connected to each other by an adhesive.

The invention claimed is:

1. An actuator comprising:
   a first motor that includes a first stator and a first rotor rotatable relative to the first stator in an axial rotation direction around a center axis;
   a second motor that is arranged away from the first motor in an axis line direction of the center axis and includes a second stator and a second rotor rotatable relative to the second stator and arranged on the same axis as the center axis of the first rotor;
   a shaft member that penetrates through the first rotor and the second rotor in the axis line direction and includes
      a first part protruding from the first rotor toward an opposite side to the second rotor in one side of the axis line direction, at least a part of the first part being provided with a spline groove extending along the axis line direction, and
      a second part protruding from the second rotor toward an opposite side to the first rotor in the other side of the axis line direction, at least a part of the second part being provided with a male screw portion;
   a spline outer cylinder that engages with the spline groove to guide the shaft member in the axis line direction along the spline groove of the shaft member and is configured to rotate together with the first rotor to enable the shaft member to rotate in the axial rotation direction around the center axis; and
   a nut member that is provided with a female screw portion engaging with the male screw portion of the shaft member and is configured to rotate together with the second rotor to enable the shaft member to move in the axis line direction of the center axis, wherein
   a diameter of the spline groove in the shaft member is larger than a diameter of the male screw portion.

2. The actuator according to claim 1, wherein the first motor and the second motor are direct drive motors.

3. The actuator according to claim 1, wherein
   an arm mounting member is fixed to an end of the first part of the shaft member, and
   the arm mounting member supports an arm part to which a workpiece is mounted.

4. The actuator according to claim 1, wherein a radially outer side of the spline outer cylinder is supported by a spline outer cylinder housing via a rolling bearing.

5. An actuator comprising:
   a first motor that includes a first stator and a first rotor rotatable relative to the first stator in an axial rotation direction around a center axis;
   a second motor that is arranged away from the first motor in an axis line direction of the center axis and includes a second stator and a second rotor rotatable relative to the second stator and arranged on the same axis as the center axis of the first rotor;
   a shaft member that penetrates through the first rotor and the second rotor in the axis line direction and includes
      a first part protruding from the first rotor toward an opposite side to the second rotor in one side of the axis line direction, at least a part of the first part being provided with a spline groove extending along the axis line direction, and
      a second part protruding from the second rotor toward an opposite side to the first rotor in the other side of the axis line direction, at least a part of the second part being provided with a male screw portion;
   a spline outer cylinder that engages with the spline groove to guide the shaft member in the axis line direction along the spline groove of the shaft member and is configured to rotate together with the first rotor to enable the shaft member to rotate in the axial rotation direction around the center axis; and a nut member that is provided with a female screw portion engaging with the male screw portion of the shaft member and is configured to rotate together with the second rotor to enable the shaft member to move in the axis line direction of the center axis, wherein the shaft member is separated into a shaft including the first part and a screw shaft including the second part, and the shaft and the screw shaft are connected to each other by screw fastening.

6. An actuator comprising:

a first motor that includes a first stator and a first rotor rotatable relative to the first stator in an axial rotation direction around a center axis;

a second motor that is arranged away from the first motor in an axis line direction of the center axis and includes a second stator and a second rotor rotatable relative to the second stator and arranged on the same axis as the center axis of the first rotor;

a shaft member that penetrates through the first rotor and the second rotor in the axis line direction and includes
- a first part protruding from the first rotor toward an opposite side to the second rotor in one side of the axis line direction, at least a part of the first part being provided with a spline groove extending along the axis line direction, and
- a second part protruding from the second rotor toward an opposite side to the first rotor in the other side of the axis line direction, at least a part of the second part being provided with a male screw portion;

a spline outer cylinder that engages with the spline groove to guide the shaft member in the axis line direction along the spline groove of the shaft member and is configured to rotate together with the first rotor to enable the shaft member to rotate in the axial rotation direction around the center axis;

a nut member that is provided with a female screw portion engaging with the male screw portion of the shaft member and is configured to rotate together with the second rotor to enable the shaft member to move in the axis line direction of the center axis; and a clamp mechanism including
- a collet through which the second part of the shaft member penetrates, and
- a cylinder including
  - a piston through which the second portion of the shaft member penetrates,
  - a cylinder tube that accommodates the piston, and
  - an elastic member that is configured to urge the piston, wherein the piston includes a chuck part configured to come in contact with an outer peripheral surface of the collet by the elastic member to press the collet against the shaft member, and the collet is configured to move away from the shaft member when gas or liquid is supplied to an inside of the cylinder tube.

7. The actuator according to claim 6, wherein the outer peripheral surface is a tapered surface having a diameter decreasing toward the chuck part, and the chuck part is an inclined surface opposed to the outer peripheral surface.

8. An actuator comprising:

a first motor that includes a first stator and a first rotor rotatable relative to the first stator in an axial rotation direction around a center axis;

a second motor that is arranged away from the first motor in an axis line direction of the center axis and includes a second stator and a second rotor rotatable relative to the second stator and arranged on the same axis as the center axis of the first rotor;

a shaft member that penetrates through the first rotor and the second rotor in the axis line direction and includes
- a first part protruding from the first rotor toward an opposite side to the second rotor in one side of the axis line direction, at least a part of the first part being provided with a spline groove extending along the axis line direction, and
- a second part protruding from the second rotor toward an opposite side to the first rotor in the other side of the axis line direction, at least a part of the second part being provided with a male screw portion;

a spline outer cylinder that engages with the spline groove to guide the shaft member in the axis line direction along the spline groove of the shaft member and is configured to rotate together with the first rotor to enable the shaft member to rotate in the axial rotation direction around the center axis; and a nut member that is provided with a female screw portion engaging with the male screw portion of the shaft member and is configured to rotate together with the second rotor to enable the shaft member to move in the axis line direction of the center axis, wherein a cylindrical space is formed between the first part and a cylindrical part that is included in an arm mounting member fixed to a top end of the first part and covers an outer periphery of the first part.

* * * * *